US012589339B2

(12) United States Patent
Ardes

(10) Patent No.: US 12,589,339 B2
(45) Date of Patent: Mar. 31, 2026

(54) OIL FILTER CARTRIDGE

(71) Applicant: Hengst SE, Münster (DE)

(72) Inventor: Wilhelm Ardes, Ascheberg (DE)

(73) Assignee: Hengst SE, Münster (DE)

( * ) Notice: Subject to any disclaimer, the term of this patent is extended or adjusted under 35 U.S.C. 154(b) by 0 days.

(21) Appl. No.: 18/990,201

(22) Filed: Dec. 20, 2024

(65) Prior Publication Data

US 2025/0121303 A1    Apr. 17, 2025

Related U.S. Application Data

(63) Continuation of application No. 18/502,769, filed on Nov. 6, 2023, now Pat. No. 12,214,302, which is a continuation of application No. PCT/EP2022/061846, filed on May 3, 2022.

(30) Foreign Application Priority Data

May 7, 2021    (EP) ..................................... 21172803

(51) Int. Cl.
B01D 27/08        (2006.01)
(52) U.S. Cl.
CPC ........ B01D 27/08 (2013.01); *B01D 2201/301* (2013.01); *B01D 2201/34* (2013.01)
(58) Field of Classification Search
CPC ............ B01D 35/306; B01D 2201/304; B01D 2201/34; B01D 2201/347
See application file for complete search history.

(56) References Cited

U.S. PATENT DOCUMENTS 4,818,397 A  *  4/1989  Joy ...................... B01D 35/153
                                                    210/450
2016/0325212 A1*  11/2016  Pflueger ............... B01D 35/153

FOREIGN PATENT DOCUMENTS

| DE | 10309428 A1 | 9/2004 |
| EP | 1870152 A1 | 12/2007 |
| EP | 2373398 B1 | 10/2012 |
| GB | 2158364 A | 11/1985 |
| WO | 2020201480 A1 | 10/2020 |

OTHER PUBLICATIONS

European Patent Office, Extended Search Report, Application No. 21172803.5, Sep. 24, 2021, 9 pages.
PCT International Search Report and Written Opinion, PCT/EP2022/061846, Jul. 28, 2022, 16 pages.

* cited by examiner

*Primary Examiner* — Benjamin M Kurtz
(74) *Attorney, Agent, or Firm* — Quarles & Brady LLP; Yakov S. Sidorin

(57) ABSTRACT

A filter cartridge configured to be removably inserted into a space of a filter housing that has a housing socket and a housing cover with a sealing surface facing inwards. The filter cartridge has a filter element forming a fluid channel with a longitudinal axis, a front end, and a rear end, as well as a connector element with a peripheral surface that provides for an increased filter area, if the peripheral surface includes a first ring surface and a second ring surface (which are plain bearing surfaces) and if a gasket is movably supported in a first axial position on the first ring surface, thereby enabling a translation of the gasket in a first direction to a second axial position onto the second ring surface.

7 Claims, 13 Drawing Sheets

OIL FILTER CARTRIDGE

CROSS-REFERENCE TO RELATE APPLICATIONS

This application is a continuation from the pending U.S. patent application Ser. No. 18/502,769 filed on Nov. 6, 2023 and published as US 2024/0075413, which is a continuation of the International Patent Application No. PCT/EP2022/061846 filed on May 3, 2022 and now published as WO 2022/233868, which in turn designates the United States and claims priority from the European Application No. 21172803.5 filed on May 7, 2021. The disclosure of each of the above-identified patent documents is incorporated herein by reference.

FIELD OF THE INVENTION

The invention relates to a filter cartridge for being removably inserted into a filter housing with a housing socket and a housing cover, e.g. to an oil filter cartridge or an air filter cartridge. The filter cartridge includes a filter element forming a fluid channel with a longitudinal axis, a front end and a rear end. The filter cartridge further includes a connector element being attached to the front end, wherein the connector element has at least a forward-facing side facing away from the front end into a forward direction and a rearward facing side facing towards the filter element in a rearward direction. A peripheral surface of the connector has a first ring surface and a second ring surface, wherein the first ring surface is located closer to the forward facing side or closer to the rearward facing side than the second ring surface. A first fluid port is in fluid communication with a first fluid opening in the radially outward facing surface of the filter cartridge. A second fluid port is in fluid communication with the fluid channel.

DESCRIPTION OF RELATED ART

Fluid filters are used in numerous applications, e.g. to filter oil being required as a lubricant and/or coolant of a (e.g. combustion) machine. Oil filters for these kind of machines shall be as small as possible to keep manufacturing costs low, to use the space provided by the hull of automobiles, planes or ships as efficiently and to keep reduce their weight. At the same time the oil filters shall be easy to service and the pressure drop for a given fluid flow through the filter shall be minimized.

EP1870152A relates to a flow optimized filter for pressurized gas having in inlet channel and an outlet channel which contain an upper filter part, and a hollow cylindrical filter element having lower filter part. The upper filter part has housing and an insert, in which the course of the inlet and outlet channels is optimized. The insert is rotatably supported and exchangeable within the housing.

DE 103 09 428 A1 suggests a gas filter with a housing top and a housing bottom. In between of these is a rotatable connecting flange. A rotation of the flange allows to convert the filter from a coalescence filter for removing condensate into a dust filter and vice versa.

GB 2 158 364A addresses the problem of providing a large diameter pipeline strainer that combines the advantages of increased filter area, easy cleaning, and low pressure drop as known for basket type strainers with the advantages of Y-type strainers being smaller in size and less expensive. The suggested pipeline strainer included a body having a chamber, an inlet to said chamber and an outlet from said chamber. The inlet and the outlet are coaxial and define a longitudinal axis. The body has a lateral opening at said chamber, a removable cover for sealing said lateral opening, and a strainer member mounted in said chamber and being removable through said lateral opening.

WO 2020/201480 A1 relates to a to a filter with a filter housing having two filter housing parts. A filter insert is replaceable arranged in the second filter housing part. The filter insert has a filter material body and two end panels. An annular seal support supports a seal that is movably guided on the filter insert in an axially limited manner relative to the end panel. The seal support simultaneously forms or has the valve element of a valve. The end panel faces the joint between the filter housing parts forms the valve seat and a medium passage is selectively released or blocked by means of the valve.

EP 2 373 398 A1 relates to an air filter with a housing including a socket and a cover enclosing a volume in which a replaceable filter cartridge is positioned. The filter cartridge comprises an essentially cylindrical filter element with a fluid channel. On top of the filter element is a connector for connecting the filter element with the socket. The connector has a first port being in fluid communication with an air outlet of the socket. The air enters the filter cartridge via a first port and passes through a conduit of the connector to a slot in the peripheral surface of the filter cartridge. The air next passes the filter element, enters the fluid channel and from there flows via a second conduit of the connector to an air inlet of the socket. The connector and the upper end of the housing cover jointly engage into a recess of the socket, wherein a collar of the connector is located in between of the socket facing surface of the tubular housing cover and the bottom of the complementary recess. The housing cover facing surface of the collar is inclined and supports a gasket. When closing the cover, the gasket is compressed in a corner being delimited by the inclined surface of the collar, the radially inward facing surface of the socket's recess the socket facing end of the housing cover.

SUMMARY

The problem to be solved by the invention is to reduce the pressure drop of filter cartridge being confined in a fluid filter housing having a given dimension and providing an outlet port and an inlet port being configured to be connected by a first and a second fluid port of the filter cartridge.

Solutions of the problem are described in the independent claims. The dependent claims relate to further improvements of the invention.

The filter cartridge according to an embodiment of the invention may be configured to be removably inserted into a filter housing with a housing socket and a housing cover. During this process the filter cartridge may be moved in a forward direction towards the socket. The filter housing may have a sealing surface facing inwards, preferably radially inwards (when assuming a circular cylindrical sealing surface). In an example, the sealing surface may be an inward facing ring surface of the housing cover. This sealing surface may preferably be centered on the filter housing axis, which at least in a first approximation may be considered to be identical with a longitudinal axis of the filter cartridge. In most applications the housing cover and the socket have complementary screw threads allowing to screw the housing cover to the socket, but other attachment methods known in the art can be used as well.

The filter cartridge includes at least a filter element forming a fluid channel defining the longitudinal axis, a front end and a rear end. These filter elements are known in the art and often but not necessarily have a hollow cylindrical shape. In this case the longitudinal axis may be identical with the cylinder axis. The filter element can be made of plied filter paper, cloth, filter foam or the like and may include end caps at their front and/or rear ends.

A connector may be attached to the front end of the filter element. The connector may have a forward-facing side facing away from the filter element and hence away from the front end of the filter element into the forward direction. This forward direction is preferably at least essentially parallel to the longitudinal axis, but deviations be them intended or unintended can be accepted. Only for conceptual simplicity, we assume that the forward direction is parallel within an angle $\alpha_l$ to the longitudinal axis, wherein $\alpha_l$ is an error margin and may be e.g. one of 30°, 20°, 15°, 10°, 5°, 1.5°, 1°, 0.5° or 0°. Thus at least essentially parallel means parallel $\pm\alpha_l$ (within $\alpha_l$), wherein $\alpha_l \in A=\{30°, 20°, 15°, 10°, 5°, 1.5°, 1°, 0.5°, 0°\}$ and an angle $\alpha$ is considered to be within "$\pm\alpha_l$," if $-\alpha_l \leq \alpha \leq \alpha_l$. Further, the connector may have a rearward-facing side facing towards the filter element and hence in a rearward direction being preferably at least essentially opposite to the forward direction. Again, deviations within $\pm\alpha_l$ can be accepted.

The connector may have a peripheral surface. This peripheral surface may be formed between the forward-facing side and the rearward-facing side and hence may be considered to connect the forward-facing side and the rearward-facing side. Thus, the peripheral surface may span from a forward edge to a rearward edge being formed by the peripheral surface and the forward-facing side or the rearward facing side, respectively. In practice these forward edge as well as the rearward edge may be rounded. Preferably, the peripheral surface may be a ring surface, particularly preferred it may be rotationally invariant under a rotation around the longitudinal axis. The rotational symmetry may as well be broken, e.g. because only discrete rotations (e.g. by rotations by $$\frac{2\pi}{n},$$

$n \in \{2, 3, 4, 5, \ldots, N\}$ and N being an integer, e.g. 1000) project the peripheral surface onto itself.

The peripheral surface may include at least a first ring surface and a second ring surface. In an example, the first ring surface may be closer to the forward-facing surface or to the rearward-facing surface. So to speak, the first and second ring surfaces may follow each other (not necessarily but possibly immediately) in the forward direction or alternatively in the rearward direction. As usual, the rearward direction may be considered to be the opposite direction of the forward direction. In other words, that ring surface which is closer to the edge between the peripheral surface and one of the forward-facing side and the rearward facing side may considered to be the first ring surface. In an example, the first ring surface may be closer to the filter element than the second ring surface. Only to avoid any misinterpretations, the first ring surface and the second ring preferably enclose the longitudinal axis. Particularly preferred they are centered on the axis. In practice, the first ring surface and the second ring surface are preferably symmetric to the rotational axis, but it is emphasized that this is only an example.

The filter cartridge may preferably have a first fluid port being in fluid communication with a first fluid opening, wherein the first fluid opening may be provided by a slot being delimited in the forward direction by the connector. For example, the first fluid opening may be located in between of the connector and the filter element, hence in this example, the fluid opening may be delimited in the rearward direction by the filter element, e.g. by a front-end cap of the filter element. In the forward direction, the fluid opening may be delimited, for example by at least a portion of the rearward-facing side of the connector. Thus, a fluid to be filtered may flow from the first fluid port, which may be in the forward-facing side of the connector through an optional first conduit to the first fluid opening in the peripheral surface of the filter cartridge and hence from there to the peripheral surface of the filter element. The fluid may then pass the filter element, e.g., radially inwards, enter the fluid channel and may be removed via as second fluid port from the fluid channel. The second fluid port may be provided by an end cap of the filter element or as well by the connector. The second fluid port may thus be fluidly connected via a second conduit with the fluid channel. The flow direction of the fluid can of course be reversed, but the described flow direction from the first port via the first conduit to and via the filter element into the fluid channel and from there to the first port may be preferred.

In an example, the first ring surface and the second ring surface are preferably plain bearing surfaces on which a gasket may be movably supported in a first axial position on the first ring surface. The movable support on the plain bearing surface preferably enables to slide the gasket on the plain bearing surface from this first axial position at least in an axial direction in a first direction onto a second axial position on the second ring surface. The first direction can coincide at least essentially with the forward direction or alternatively with the rearward direction. To coincide at least essentially means that an angle of 0° between the corresponding vectors of movement is preferred but that deviations, e.g. $\pm\alpha_1$, $\alpha_1 \in A=\{30°, 20°, 15°, 10°, 5°, 1.5°, 1°, 0.5°, 0°\}$, can be accepted.

Only to avoid any misunderstandings, the term "first direction" indicates the direction of movement when shifting/sliding the gasket from the first axial position into the second axial position. The "second direction" is opposite to the first direction. The term "forward direction" in contrast refers to the location of the connector relative to the filter element. The forward direction points at least essentially along the longitudinal axis from the filter element towards the connector. The "rearward direction" is opposite to the forward direction. Thus, there are two sets of directions a first set (forward/rearward) being defined by the position of the connector relative to the filter element and a second set of directions (first/second direction) relating to the movement of the gasket when sliding onto the second ring surface.

In the second axial position, the gasket does not need to be entirely on the second ring surface, but it may be. This shifting from the first axial position to the second axial position may be due to the fluid pressure differential being formed between the forward facing surface and the rearward-facing surface of the gasket. This measure thus allows to omit clamping means like those explained in EP 2373398 A for clamp the gasket already when closing the cover. The differential pressure between the respective sides of the gasket so to speak pushes the gasket into the gasket's second axial position in which it may seal a gap between the filter housing and the filter cartridge. Omitting these clamping means allows to slightly increase the diameter and the axial extension of the filter element. The filter surface can therefore be increased by a few percent. This increase provides a reduction of the pressure drop caused by the filter element. In case of an automotive application this translates immediately into a reduced $CO_2$ emission per km and/or an increase in the range for a given amount of fuel/energy.

It is considered implicit that the second axial position is preferably configured to match the axial position of the filter housing's sealing surface. In this context match means that if the filter cartridge is mounted into the housing, the gasket sealingly contacts the sealing surface at least in the gasket's second axial position. (Thus, it is as well implicit that the radial extensions of the sealing surface and the gasket's housing facing surface preferably match each other).

In an example, the radius of the first ring surface may be smaller than the radius of the second ring surface. In addition or alternatively, an intermediate ring surface with a preferably non-constant diameter may be located in between of the first ring surface and the second ring surface. By this measure, shifting the gasket, e.g. by the fluid pressure, into its second axial positions automatically provides for an increase of the gaskets inner radius and thus as well its outer radius. The gasket thus seals tightly while not blocking or otherwise hindering the housing cover to be positioned over the filter cartridge, as during this stage the gasket may (preferably) still be in its first axial position, which may be considered as a retracted position. The contact pressure between the gasket and the connector and preferably as well between the gasket and the housing cover is thus increased by the fluid pressure pushing the gasket into its second axial position.

Alternatively or in addition, the gasket may have a first gasket portion with a first connector facing surface defining a first inner radius and a second gasket portion with a second connector facing surface defining a second inner radius, wherein if the gasket is in its first axial position the first connector facing surface may be preferably located on the first ring surface and may preferably be closer to the second ring surface than the second connector facing surface. If the first inner radius is greater than the second inner radius, the gasket radially extends if it is shifted into its second axial position, in which the second inner radius of the second gasket portion adapts to the radius of the first and/or second ring surface. Thus, the inner radius of the second gasket portion increases, if the gasket is axially shifted from its first axial position into its second axial position. This leads as well to the effect of an increased contact pressure between the gasket and the connector while at the same time minimizing the outer diameter of the gasket in the first axial position. Further, the increase of the inner radius of the gasket at the same time increases the contact pressure from the gasket onto the connector's peripheral surface. Both effects contribute to the effect that the gasket reliably seals if in its second axial position, while not blocking or otherwise hindering the cover to be positioned over the filter cartridge when it is first axial position.

For example, the first ring surface may have an at least essentially constant first ring radius. Similarly, the second ring surface may have an at least essentially constant second ring radius. In between of the first and the second ring surfaces may be at least a portion of the intermediate ring surface with a normal being at least essentially parallel (i.e. parallel within an error margin $\pm\alpha_o$, $\alpha_o \in A = \{30°, 20°, 15°, 10°, 5°, 1.5°, 1°, 0.5°, 0°\}$). The intermediate ring surface would thus resemble a step, which provides the advantage of shortening the required peripheral surface thereby providing even more space for the filter element. As already apparent, the first and second ring surfaces do not necessarily have a constant radius. Even if a constant radius may be preferred, deviations can be accepted. For example, a ring surface can be considered to have a constant ring radius if the normal of the ring surface is orthogonal to the longitudinal axis within an error margin of $\pm\alpha_o$ and $\alpha_o \in A$.

In an example, the gasket includes a central portion. In a cross sectional view the contour of the central portion may be e.g. circular, elliptic, polygonal or a combination thereof. A first leg and preferably as well a second leg may be attached to the central portion wherein the optional first and second legs may each have a free end. The free ends, as well referred to as distal ends, preferably extend from the central portion at least essentially opposite to the first direction. As already apparent at least essentially opposite to the first direction means opposite to the first direction with an error margin $\pm\alpha_d$, $\alpha_d \in A_d = \{60°, 45°, 30°, 20°, 10°, 5°, 2.5°, 0°\}$. This shape of the gasket provides for an increased initial sealing between the connector and the housing cover, while keeping friction low. Hence, the gasket may be pushed particularly quickly, e.g. by the fluid pressure from its first axial position into its second axial position. Potential fluid leakage during initial ramp up of the fluid pressure is reduced.

Particularly preferred, the first leg and the second leg radially delimit a groove. The groove may have a bottom being closer to the central portion of the gasket than the distal ends of the first and second legs. Hence, the groove may be open in a second direction being at least essentially opposite to the first direction. The width of the groove preferably increases towards the second direction with increasing distance from the central portion. The groove increases the surface area of the gasket being subjected to the oil pressure and thereby the legs are forced to attach to the peripheral surface or the inner surface of the cover, respectively, once the gasket reached its (final) second axial position. The gasket thus seals the gap particularly effectively.

In an example, the gasket, if located in its first axial position, may overlap the first fluid opening and hence reduces the clearance of the first fluid opening or at least partially covers the first fluid opening. This overlapping enables to further reduce the axial extension of the connector and the amount by which the gasket extends when shifted into the second axial position. This contributes to further increase the size of the filter element while at the same time reducing the initial breakaway force required for shifting the gasket into its second axial position, not only because the contact surface may be reduced, but in addition because the (initial) fluid flow bends the overlapping portion of the gasket outwards.

Optionally, the filter cartridge may include a pusher, for example a pusher ring. The pusher may be located at the side of the gasket facing opposite to the first direction (i.e. at the side of the gasket facing into the second direction). Further, the pusher may radially extend over the front end of the filter element and/or the connector and the orthogonal projections of the pusher and the gasket onto a plane being orthogonal to the longitudinal axis may overlap. The pusher may be forced against the gasket and thereby reduces the risk that the gasket may be shifted unevenly from the first axial position into the second axial position. Damages and malfunctions of the gasket can thus by avoided. As already apparent, the pusher may be a ring., a ring segment or include a number of spaced ring segments.

The pusher may have a gasket facing pusher surface providing an abutment delimiting the movement of the gasket against the first direction. The pusher may hence reinforce the gasket and/or block the gasket from accidentally being pushed in the second direction of the connector.

For example, the pusher may radially extend over the gasket if the gasket is in its first axial position (or have the same outer radius as the gasket), but the outer radius of the pusher may preferably be smaller than the outer radius of the gasket if the gasket is in its second axial position (unless the gasket is radially compressed). The pusher may thus interact with a step or at least one protrusion in the housing cover, which entrains the pusher towards the gasket, when inserting the filter cartridge in the housing cover and/or when closing the housing cover.

Optionally, the pusher may be axially movable between a first pusher position in which the pusher abuts the front-end and a second pusher position in which the pusher sits on the peripheral surface of the connector and/or in which the pusher abuts the intermediate surface. For example, the pusher may have a radially inwardly facing surface having a radius being smaller than smallest radius of the second ring surface. The such supported pusher efficiently supports the fluid-pressure induced shift of the gasket towards its second axial position.

The filter cartridge may include at least one, preferably at least two, particularly preferred at least three spacer element(s) positioned in the slot, i.e. in the at least one first fluid opening. Alternatively, the at least one spacer element (or briefly spacers) may be considered to separate multiple first openings in the peripheral surface of the filter cartridge. The axial extension of the at least one spacer element may define the axial dimension of the slot, i.a. of the at least one first opening. The at least one spacer element may be unitary with the connector and/or or a front-end cap of the filter element. In an example, the least one spacer centers the pusher at least in its first pusher position relative to the longitudinal axis. For example, the radial extension of the at least two spacer elements may match the radius of the first ring surface. Match indicates that the inner radius of the pusher may be identical to or only slightly larger (e.g. between 2 mm and 0.05 mm) than the outer radius being defined by the spacer elements. The corresponding gap may thus be selected to allow an axial movement of the pusher relative to the spacer while at the same time centering the pusher, at least approximately.

The radially outward facing surface of at least one spacer element may preferably run, or in other words extend, continuously into the first surface. Thereby, the pusher as well as the gasket can slide reliably in the forward direction.

Preferably, the filter cartridge may have at least one block been located between the second ring surface and the edge (including a continuous transition=rounded edge) being defined by the forward facing surface or by the rearward facing surface, respectively. In other words, the at least one optional block may preferably be in front of the second ring surface, wherein in front of relates to the first direction. In still other words, the block may be at the side of the second ring surface being opposite to the first ring surface. Thus, in case the first ring surface is closer to the filter element than the second ring surface, the block may be between the second ring surface and the edge being formed by the forward-facing surface of the connector and the peripheral surface. In case the first ring surface is closer to the forward-facing surface of the connector, the block may be between the second ring surface and edge formed by the peripheral surface and the rearward-facing surface of the connector. Accordingly, the block may delimit the movement of the gasket in the first direction. The at least one optional block may thus contribute to properly positioning the gasket in the axial direction by the oil pressure. The at least one block may hence delimit the movement of the gasket in the first direction. The at least one block may be provided by at least one protrusion on the connector's peripheral surface.

As already apparent, in operation the filter cartridge may be placed in a filter housing with the housing socket and the removable housing cover. The housing socket may have a fluid outlet configured to provide (e.g. unfiltered) fluid to the first port and a fluid inlet configured to receive (e.g. filtered) fluid from the second port. The housing cover may have an inner surface radially enclosing the filter cartridge's filter element and the connector while providing a radial gap. The housing cover may preferably have a sealing surface facing radially inwards and being configured to be contacted by the gasket at least in the gasket's second axial position. Thus, the gap may be sealed by the gasket into a socket side gap and a filter element side gap in case the gasket may be in its second axial position.

BRIEF DESCRIPTION OF THE DRAWINGS

In the following, the invention will be described by way of example, without limitation of the general inventive concept, on examples of embodiment and with reference to the drawings.

Figure 1:
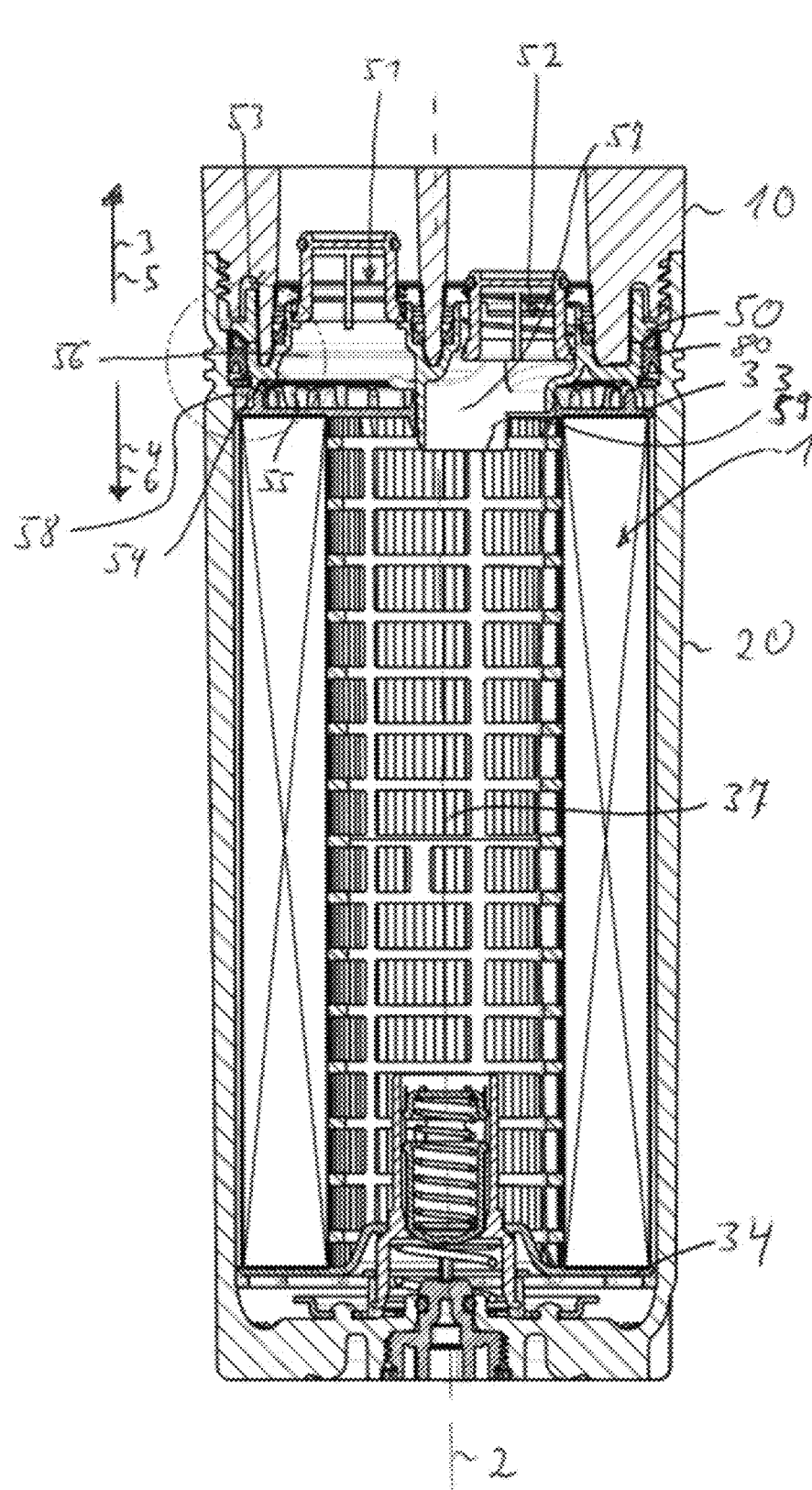
FIG. 1 presents an example filter cartridge in an example filter housing.

Generally, the drawings are not to scale. Like elements and components are referred to by like labels and numerals. For the simplicity of illustrations, not all elements and components depicted and labeled in one drawing are necessarily labels in another drawing even if these elements and components appear in such other drawing.

While various modifications and alternative forms, of implementation of the idea of the invention are within the scope of the invention, specific embodiments thereof are shown by way of example in the drawings and are described below in detail. It should be understood, however, that the drawings and related detailed description are not intended to limit the implementation of the idea of the invention to the particular form disclosed in this application, but on the contrary, the intention is to cover all modifications, equivalents and alternatives falling within the spirit and scope of the present invention as defined by the appended claims.

DETAILED DESCRIPTION

In FIG. 1 a first embodiment of a filter cartridge 1 is shown. The filter cartridge 1 may be located inside a filter housing with a socket 10 and a housing cover 20. The filter housing may have a sealing surface 25 facing inwards, preferably radially inwards towards the longitudinal axis 2 of the filter cartridge 1.

The filter cartridge 1 may have a connector element 50, as well briefly "connector 50", for fluidly connecting a filter element 30 of the filter cartridge 1 into a fluid flow. The filter element 30 may define a fluid channel 37 with a longitudinal axis 2. In operation a fluid (e.g. an oil or gas, such as for example air), may enter the filter cartridge 1 via a first fluid port 51 of the connector 50, flow through a first conduit 56 to a first fluid opening 58 in the peripheral surface of the filter cartridge 1. In the depicted example, the first fluid opening 51 may be a slot being formed in between of a rearward-facing side 54 of the connector 50 and a front-end cap 33 of the filter element 30. But this location is only an example. In other examples the boundary of the first fluid opening 58 may be entirely defined by the connector 50 or alternatively by the front-end cap 33 or even by some other part of the cartridge 1. In any case, the fluid may leave the filter cartridge 1 via the first fluid opening 58 and enter a gap 85 being provided between the housing cover 20 and the filter element 30. From there, the fluid may pass the filter element 30 and enter into the fluid channel 37. The fluid may be removed from the fluid channel 37 via a second fluid port, which may e.g. be located in the front-end cap 33. Alternatively, as shown in the depicted example, filtered fluid may be removed through a second fluid opening 59 in the connector 50. The optional second fluid opening 59 may be in fluid communication with an optional second fluid port 52 via an optional second conduit 57. The second fluid port 52 may preferably be coupled to a filtered fluid inlet of the filter housing.

A gasket 80 may be located between a peripheral surface 60 of the connector 50 and the sealing surface 25 of the housing, to thereby separate the gap 85 in a forward portion and a rearward portion. This separation disables a fluid flow from the rearward portion into the forward portion of the gap 85 which fluid flow would lead to leakage of the (e.g. oil) filter housing. The gasket 80 thus seals the forward portion from the rearward portion.

Figure 2:
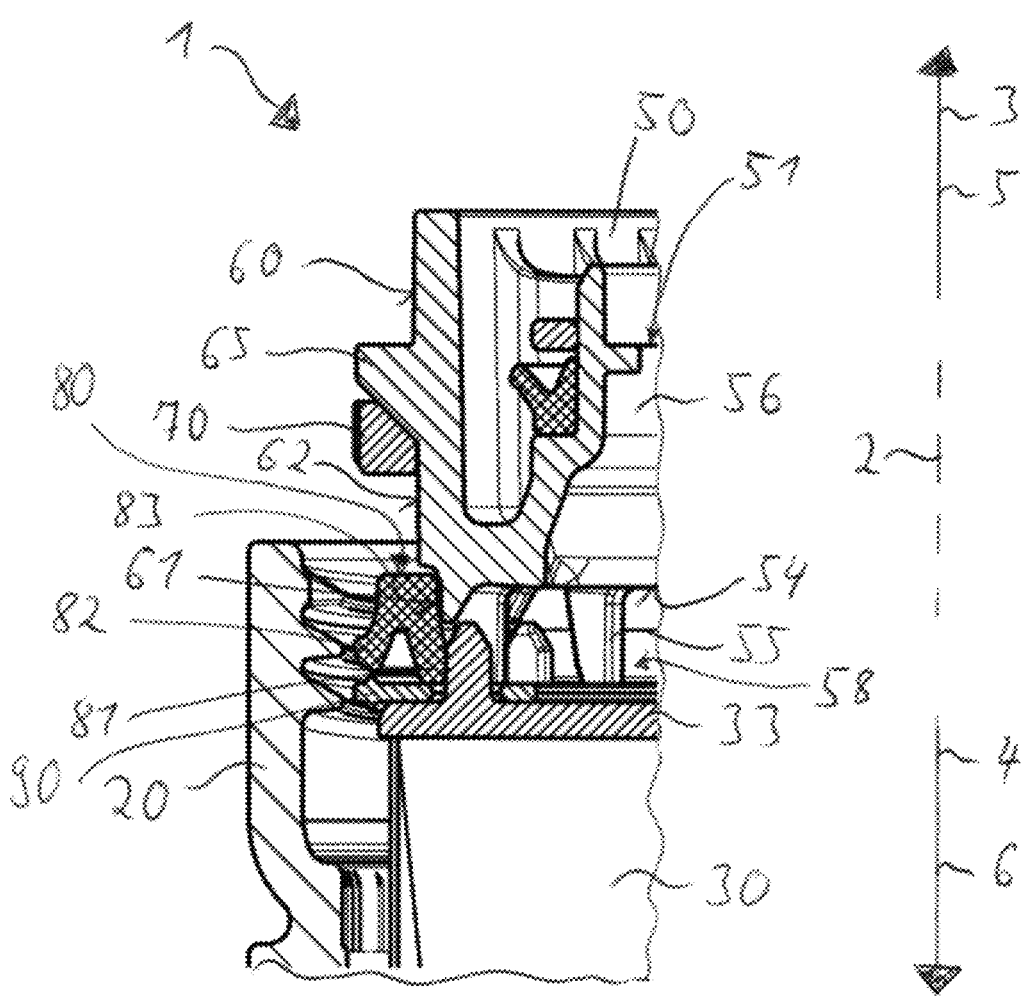
FIG. 2 presents a detail of the filter cartridge of FIG. 1 prior to be mounted.

FIG. 2 presents a detail of the filter cartridge 1 prior to or during installation of the filter cartridge 1. As can be seen, the connector 50 may have a forward-facing surface 53 and a rearward-facing surface 54 at its opposite end. The forward-facing surface 53 and the rearward-facing surface 54 may be connected by the peripheral surface 60. The peripheral surface 60 may preferably have a first ring surface 61 and a second ring surface 62 (see as well FIG. 3). These first and second ring surfaces 61, 62 may be centered around the longitudinal axis 2 (c.f. FIG. 1). Herein we assume the ring surfaces to be rotationally invariant under a rotation around the axis 2, but this constraint can be released and is only for conceptual simplicity.

As can be seen in FIG. 2, the radius of the first ring surface 61 may be smaller than the radius of the second ring surface 62 (for any azimuthal angle). But it is emphasized that this choice of relation is only an example. They may as well have the same radius. It is less preferred, but still possible that the radius of the first ring surface 61 may be greater than the radius of the second ring surface 62.

Further, as shown, an optional intermediate ring surface 63 connects the first ring surface 61 and the second ring surface 62. Alternatively, the first ring surface 61 and the second ring surface 62 are immediately adjacent to each other.

As depicted in FIG. 2, the gasket 80 may be located in its first axial position on the first ring surface 61. This is the intended position of the gasket 80 prior to inserting the filter cartridge 1 into the filter housing. In this example the gasket 80 may have a central portion 83 being located on the first ring surface 61 and two optional legs 81, 82 which may extend at least essentially in the rearward direction 4 (as will be explained below with reference to FIGS. 9 and 10, the direction of the axial movement relative may be reversed relative to the forward direction as explained in more detail with respect to FIG. 9 to FIG. 11). The first leg 81 may extend over the first fluid opening 58 and hence partially closes the first fluid opening 58. In between of the first leg 81 and the second leg 82 may be an optional groove. The bottom of the groove may be delimited as shown by the central portion 83.

An optional pusher 90 may be located in between of the gasket 80 and the front end of the filter element 30. The optional pusher 90 may be a ring or may include a number of ring segments configured to support the gasket 80. The outer radius of the pusher 90 may preferably be at least essentially the same (preferably identical, but small deviations e.g. ±1 mm, ±2 mm, ±3 mm and/or, ±5 mm, can be accepted) as the outer radius of the gasket 80 in its first axial position. As apparent, preferably these radiuses are identical, but small deviations, e.g., ±1 mm, ±2 mm, ±3 mm and/or ±5 mm can be accepted.

Figure 3:
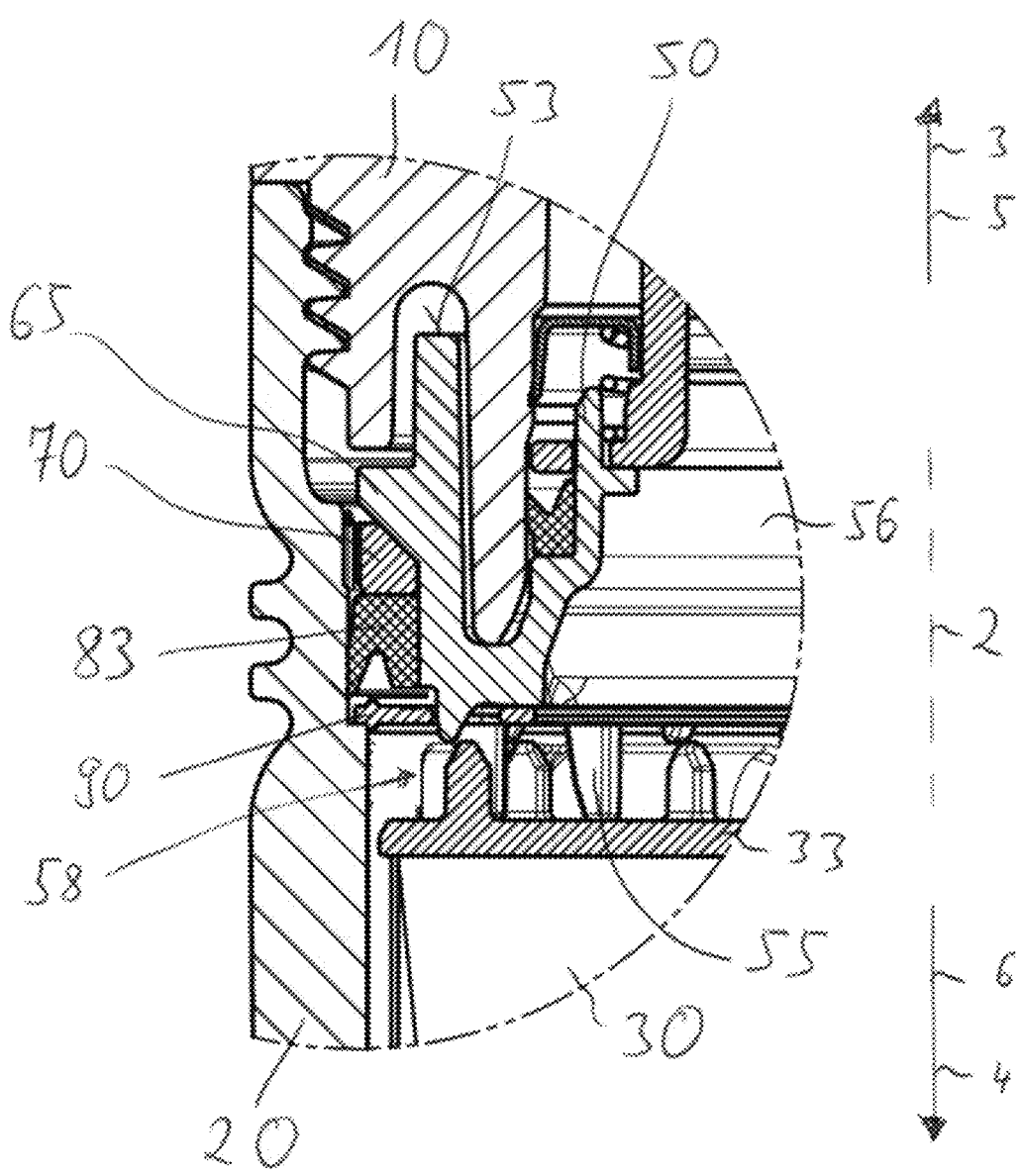
FIG. 3 presents a detail of the filter cartridge of FIG. 1 after being mounted, but prior to its first use.

FIG. 3 presents the same filter cartridge 1 as in FIG. 2, after it has been fully installed in the housing, but prior to the first operation of filter system. As can be seen, the pusher 90 may have been entrained into a second pusher position by the housing cover 20 and shifted the gasket 80 in a first direction 5, i.e. towards the second ring surface 62. Due to the increased radius of the second ring surface 62, the outer radius of the gasket 80 may have been increased as well. The second free leg 82 radially extends over the pusher 90 (at least if the gasket 80 is not radially compressed) and hence seals a gap between the gasket 80 and housing. The first leg 81 as well as the central portion 83 seal the gap between the gasket 80 and the peripheral surface 60.

Figure 4:
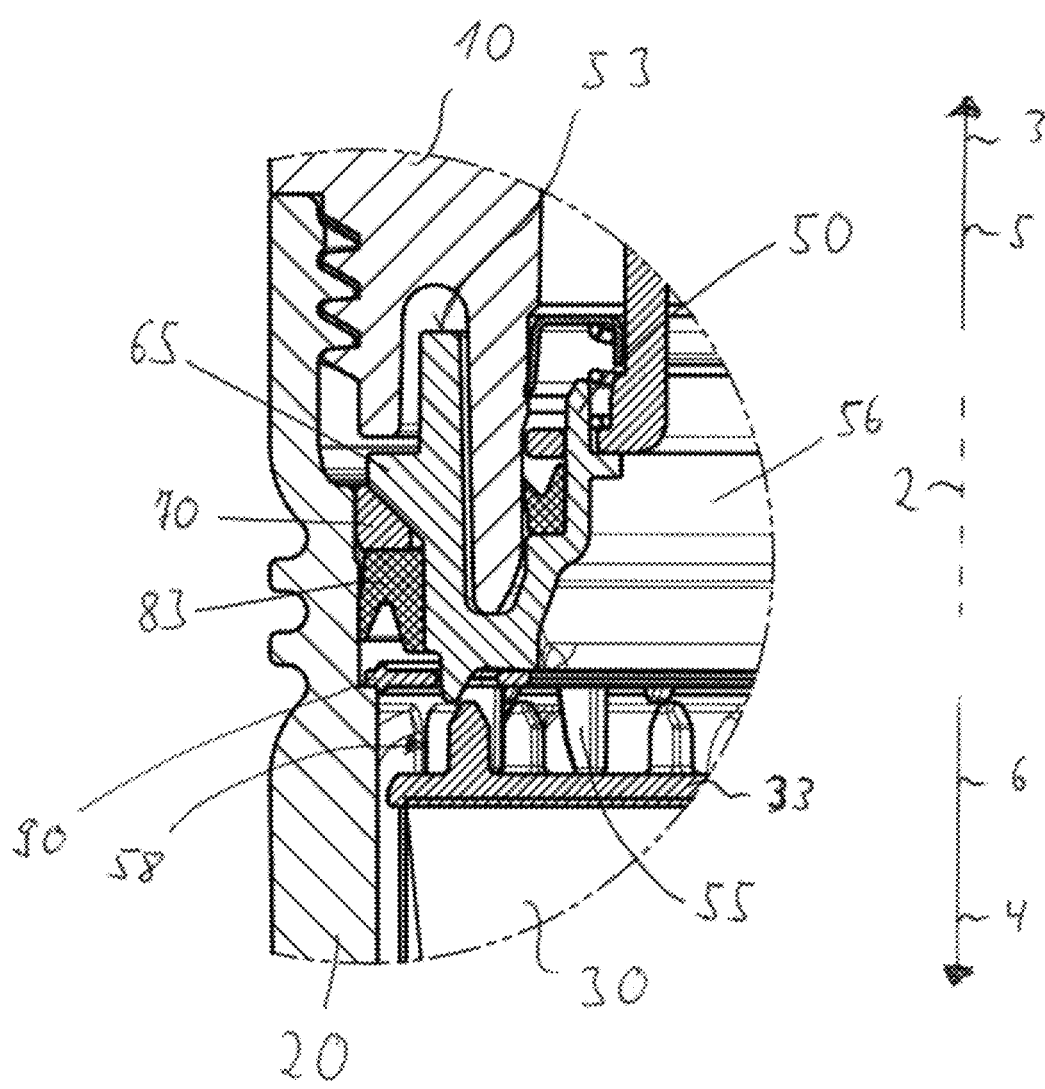
FIG. 4 presents a detail of the filter cartridge of FIG. 1 after being mounted, but after its first use.

In FIG. 4, the gasket 80 has been fully shifted into its second (and thus final) position by the pressure difference between the inside and the outside of the housing: When first starting operation of the filter cartridge 1, a fluid enters the filter cartridge 1 via the first port 51 and flows to the first fluid opening 58. The fluid to be filtered may have a pressure being sufficient at least to drive the fluid through the filter element 30. This fluid pressure may thus be exerted onto the side of the gasket 80 which faces into the second direction 6 and thus pushes the gasket 80 into the first direction 5 into its second axial position, thereby forcing an optional wedge element 70 upwards and outwards. The wedge element 70 may be thus shifted into the gap between filter cartridge 1 and the housing cover and secures the housing cover 20 against unintended opening. To this end, the connector 50 may include at least one radially extending protrusion 65 providing a block 65 configured to force the wedge element 70 radially outwards when shifting the wedge element 70 upwards.

As already apparent, in this example the first direction 5 coincides at least essentially with the forward direction 3, whereas the second direction 6 coincides with the rearward direction 4. As will be apparent from another example below, the first and second directions 5, 6 can be reversed.

Figure 5:
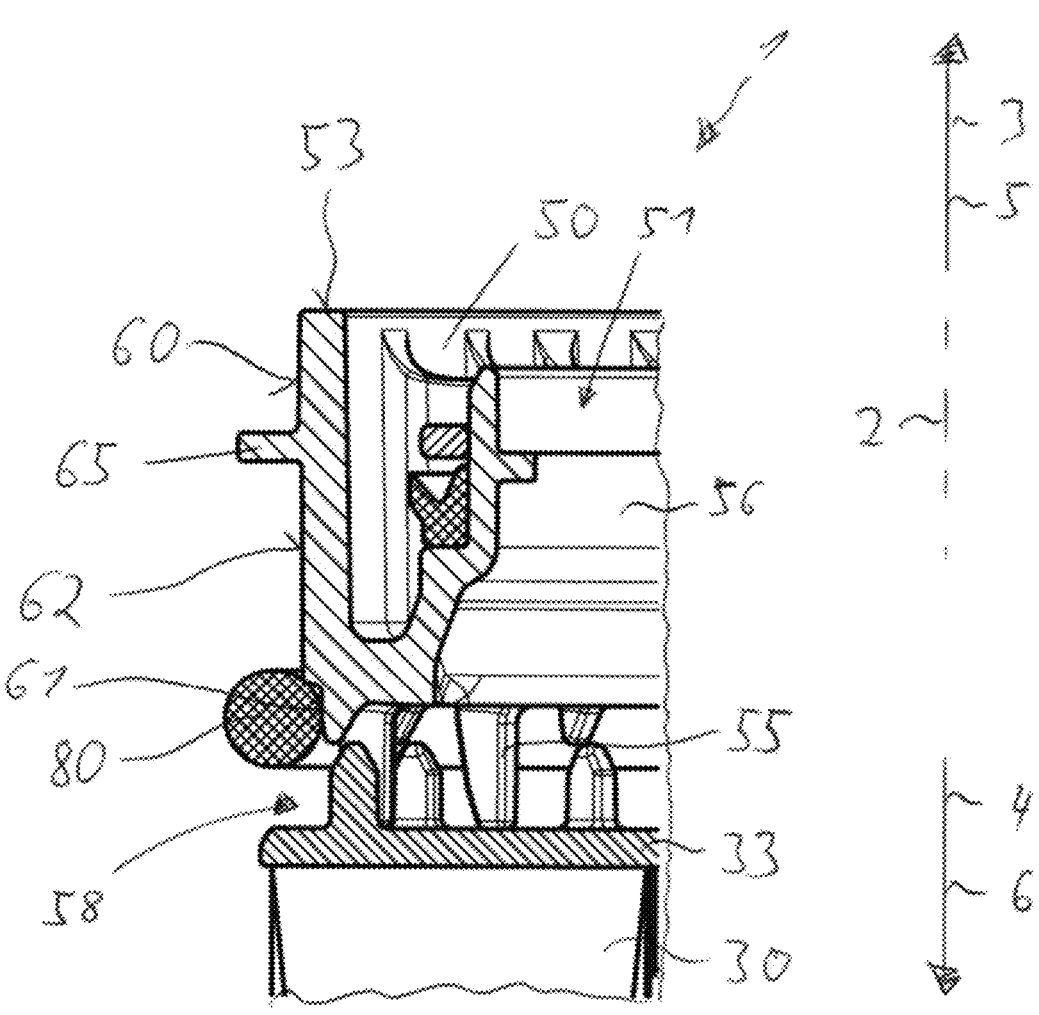
FIG. 5 presents a detail of another filter cartridge prior to be mounted.
Figure 6:
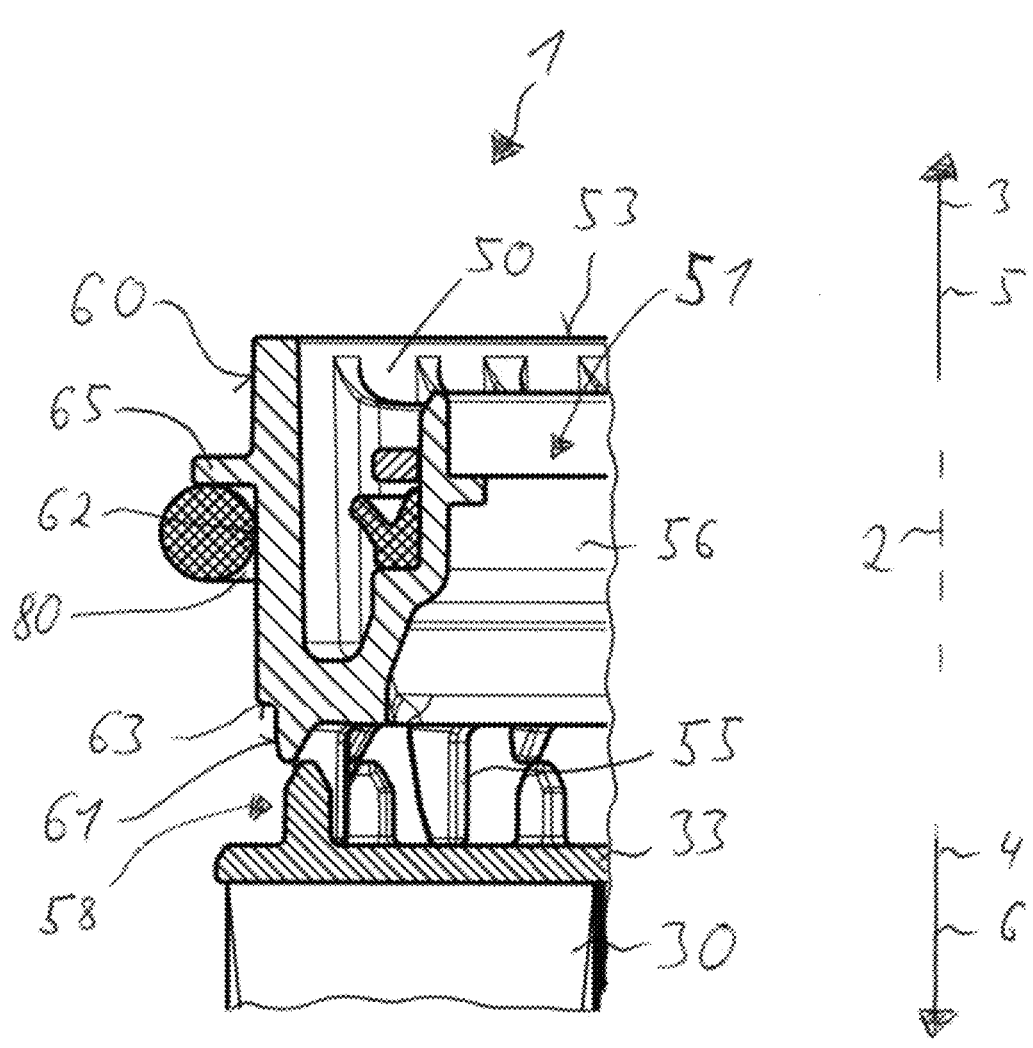
FIG. 6 presents a detail of the filter cartridge of FIG. 5 prior to be mounted.

FIGS. 5 and 6 show another example of a filter cartridge 1 prior to mounting and after first use. The only difference between the examples explained in FIGS. 1 to 4 is that the gasket 80 may have a simpler shape (an at least essentially circular cross section). In this example the preferred first and second legs 81, 82 have been omitted. Further the optional pusher 90 as well as the optional wedge element 70 have been omitted. Beyond, the description of FIGS. 1 to 4 can be ready on FIGS. 5 and 6 as well. As can be seen when comparing FIG. 5 and FIG. 6, the gasket 80 may initially be in its first axial position on the first ring surface 61 of the connector's peripheral surface 60. In FIG. 6, the gasket 80 may have been shifted in the first direction 5 into its second axial position on the second ring surface 62 of the connector's peripheral surface 60. The omitted pusher 90 and/or the omitted wedge element 70 as shown in other figures can optionally be added. In other words, the gasket 80 as shown in FIGS. 1 to 4 can be replaced by the gasket 80 of FIGS. 5 and 6 and vice versa. Other types of gaskets can be used as well.

Figure 7:
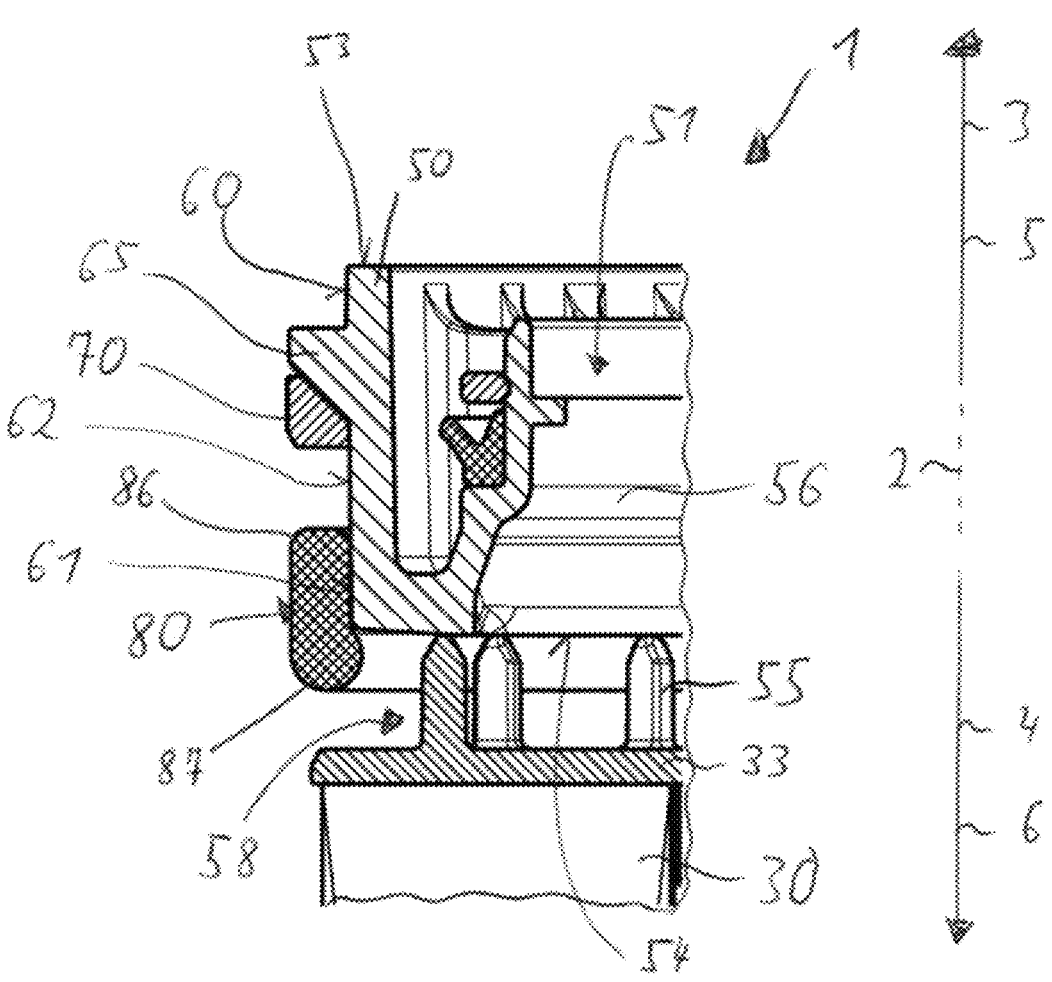
FIG. 7 presents a detail of another filter cartridge prior to be mounted.
Figure 8:
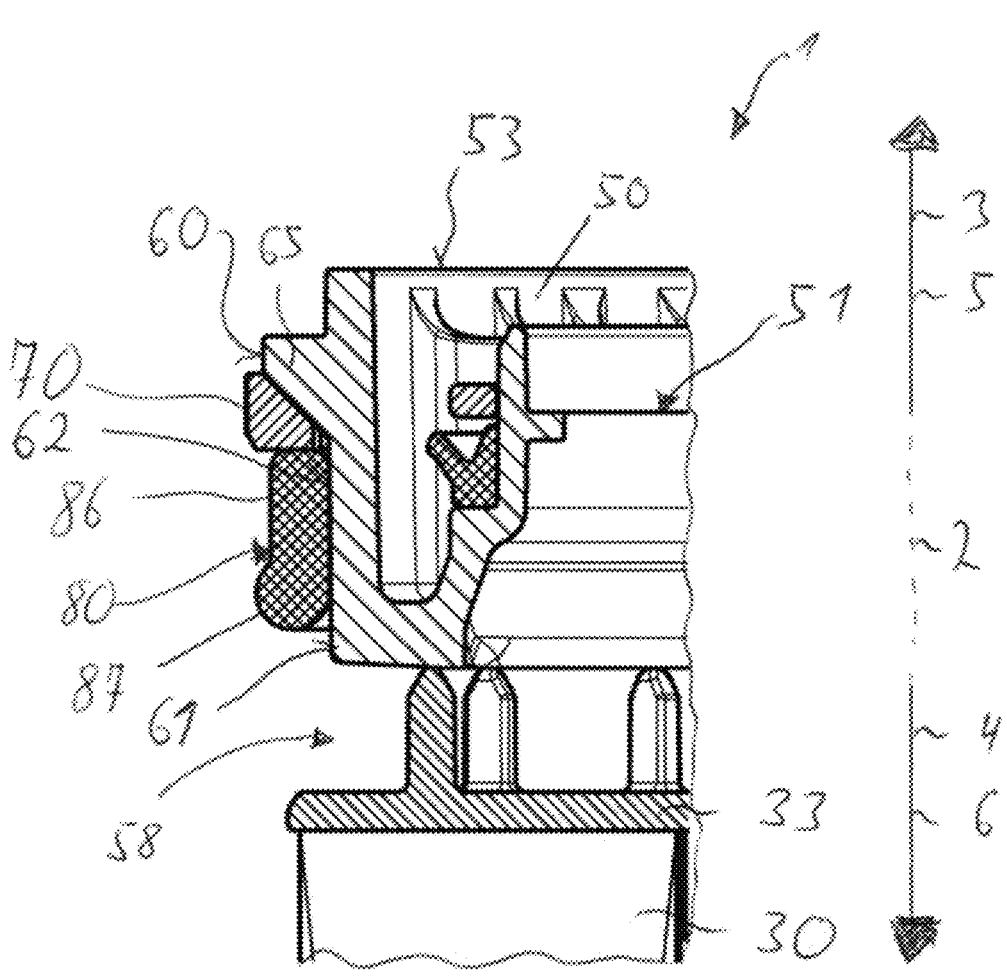
FIG. 8 presents a detail of the filter cartridge of FIG. 7 after mounting of the filter cartridge.

FIG. 7 presents another example. Again, the description of FIG. 1 to FIG. 6 can be read on FIGS. 7 and 8 as well, only differences will be explained. Different to the example filter cartridges 1 of FIG. 1 to FIG. 6, the first and second ring surfaces 61, 62 in FIG. 7 and FIG. 8 have the same radii. Further, different to the example filter cartridges 1 of FIG. 1 to FIG. 6 the gasket 80 may have first gasket portion 86 and a second gasket portion 87, wherein the first gasket portion 86 may be in front of the second gasket portion 87 with reference to the first direction 5. The second gasket portion 87 may extend over the rearward facing end of the peripheral surface 60 and may have a thickness greater than the first gasket portion 86, wherein the thickness may be the difference between the maximum radius of the second gasket portion 87 and the minimum radius of the second gasket portion 87. In other words, the inner radius of the second gasket portion 87 may be smaller than the inner radius of the first gasket portion 86 and hence as well smaller as the radius of the first ring surface 61. The second gasket portion 87 may thus engage into the first fluid opening, at least while in its first axial position as shown in FIG. 7. When shifted in the first direction 5 into the second axial position the second gasket portion 87 radially may expand and thereby the sealing between the lower rearward and the upper forward gap portions may be enhanced. The optional wedge element 70 may have the same function as in FIGS. 1 to 4 and to avoid repetitions, we may reference to the above. The pusher 90 of FIG. 1 to FIG. 4 has been omitted in this example, but it may be added. Further, the gasket 80 of FIG. 7 and FIG. 8 can as well be positioned on the peripheral 60 surfaces of FIG. 1 to FIG. 6., i.e. the first and second ring surfaces 61, 62 do not necessarily have the same radii when using the gasket 80 of FIGS. 7 and 8. Depending on the inner radius of the second gasket portion 87, the first ring surface 61 may even have a greater radius than the second ring surface 62.

Figure 9:
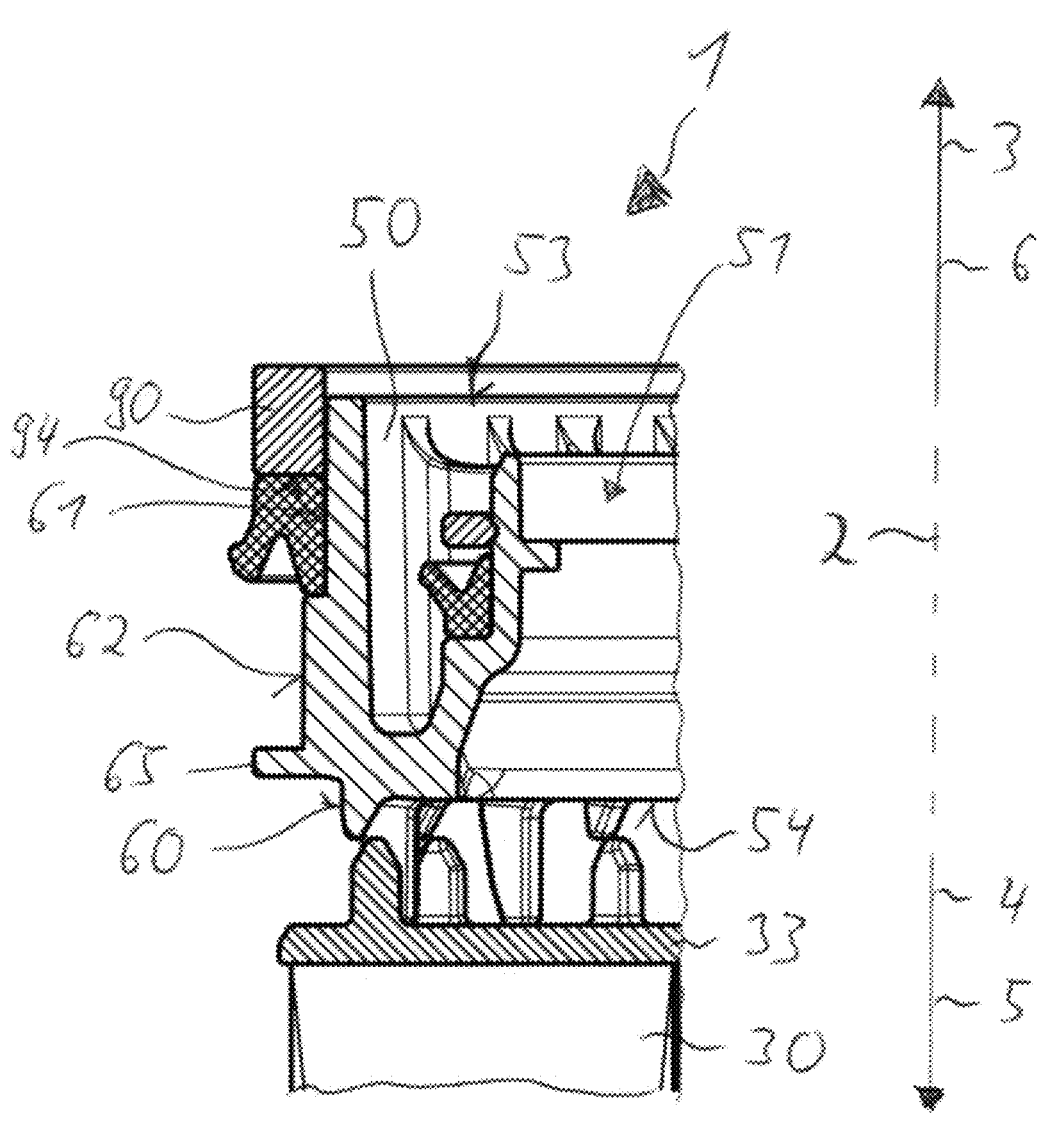
FIG. 9 presents a detail of another filter cartridge prior to be mounted.
Figure 10:
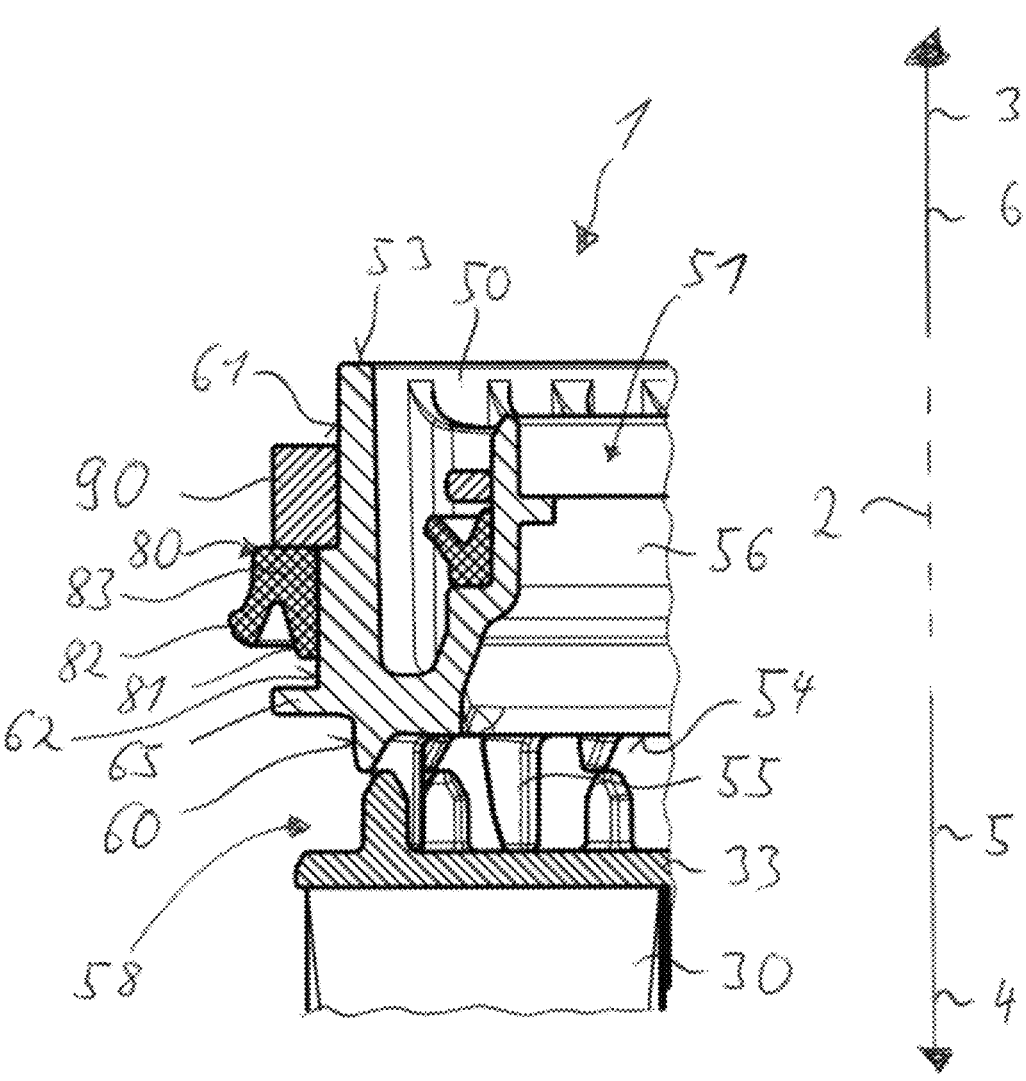
FIG. 10 presents a detail of the filter cartridge of FIG. 5 after mounting of the filter cartridge.
Figure 11:
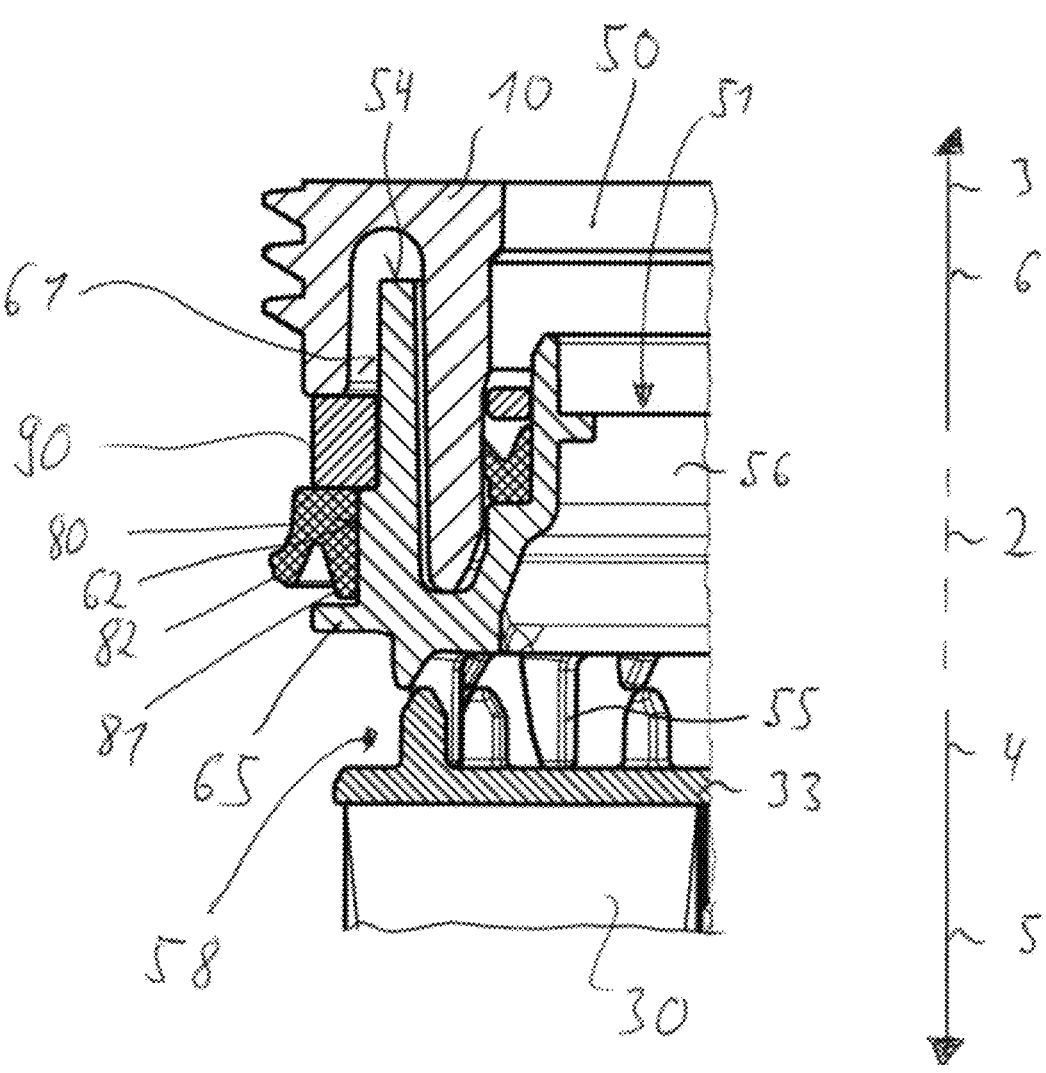
FIG. 11 presents a detail of another filter cartridge after mounting of the filter cartridge.

FIGS. 9 and 10 present a first example and FIG. 11 presents a second example in which the gasket 80 may be pushed in the rearward direction 4 when shifting the gasket 80 from its first axial position on the first ring surface 61 to a second ring surface of the peripheral surface 60. Thus, in these examples the first direction 5 coincides with the rearward direction 4. The filter cartridge 1 of these examples may have an optional pusher 90 being shown in FIG. 11, only. In the examples of FIGS. 9 and 10 the pusher has been omitted. In the example of FIG. 11 the optional pusher may be located in front of the gasket 80, wherein in front of references to the forward direction 3. When referencing to the first direction, the pusher 90 would be behind the gasket. With respect to the orientation of FIG. 11, the pusher 90 may be above the gasket 80. In the first axial position, the pusher 90 and the gasket 80 are located on the first ring surface 61, which in this example may preferably have as a smaller radius than the second ring surface 62. When mounting the filter cartridge 1, it may easily be fitted into the filter cover 20 because the outer radius of the gasket 80 may be smaller than the corresponding free radius of the housing cover 20. When closing the housing cover 20, a housing cover facing rim 15 of the socket 10 abuts (optionally via the optional pusher 90, see FIG. 11) the gasket 80 and shifts the gasket 80 relative to the connector 50 in the first direction 5 onto the second ring surface 62 (see FIG. 10). Thereby, the outer radius of the gasket 80 may be increased, which leads to a reliable seal between the two gap portions.

Figure 12:
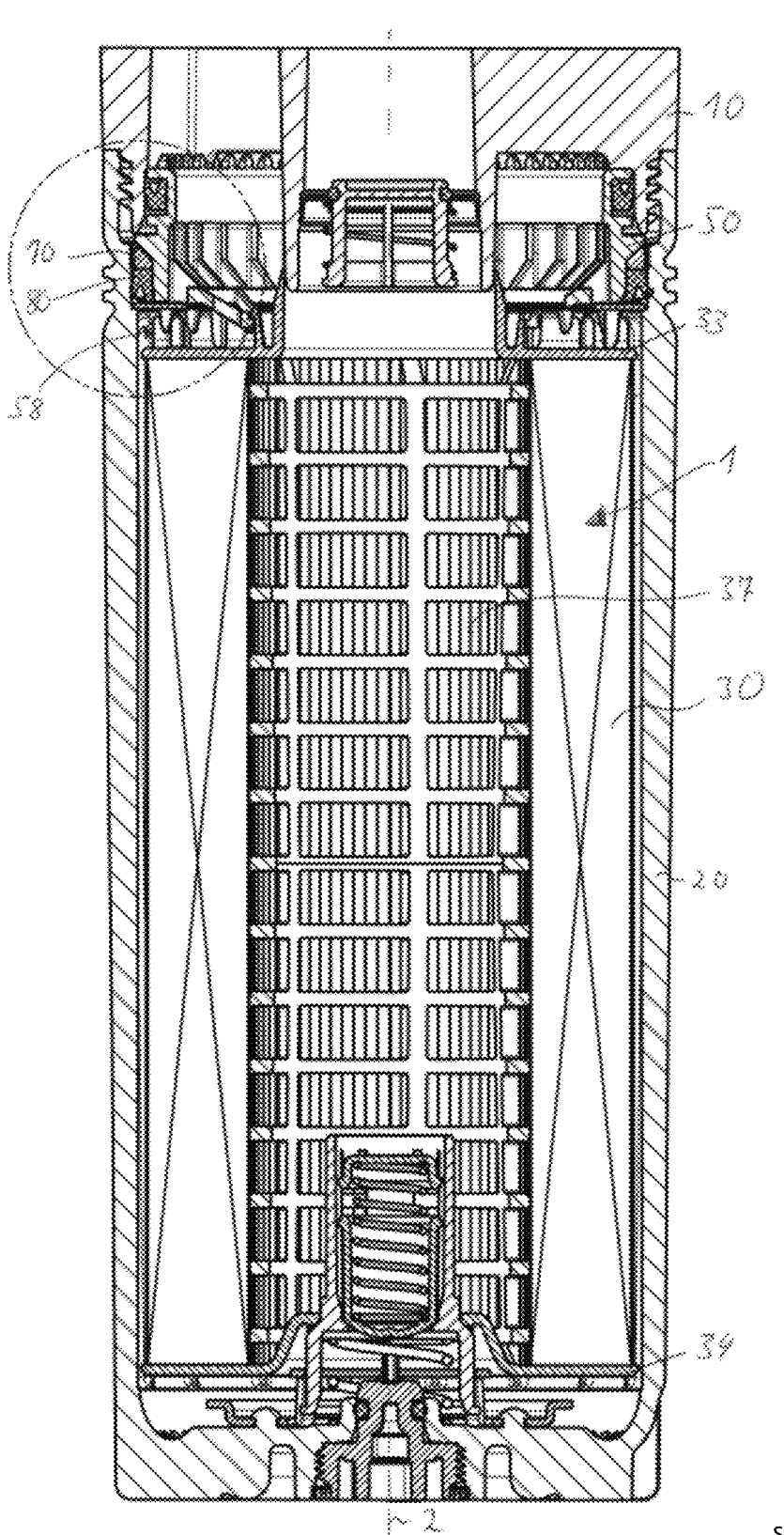
FIG. 12 presents another example filter cartridge in another example filter housing.
Figure 13:
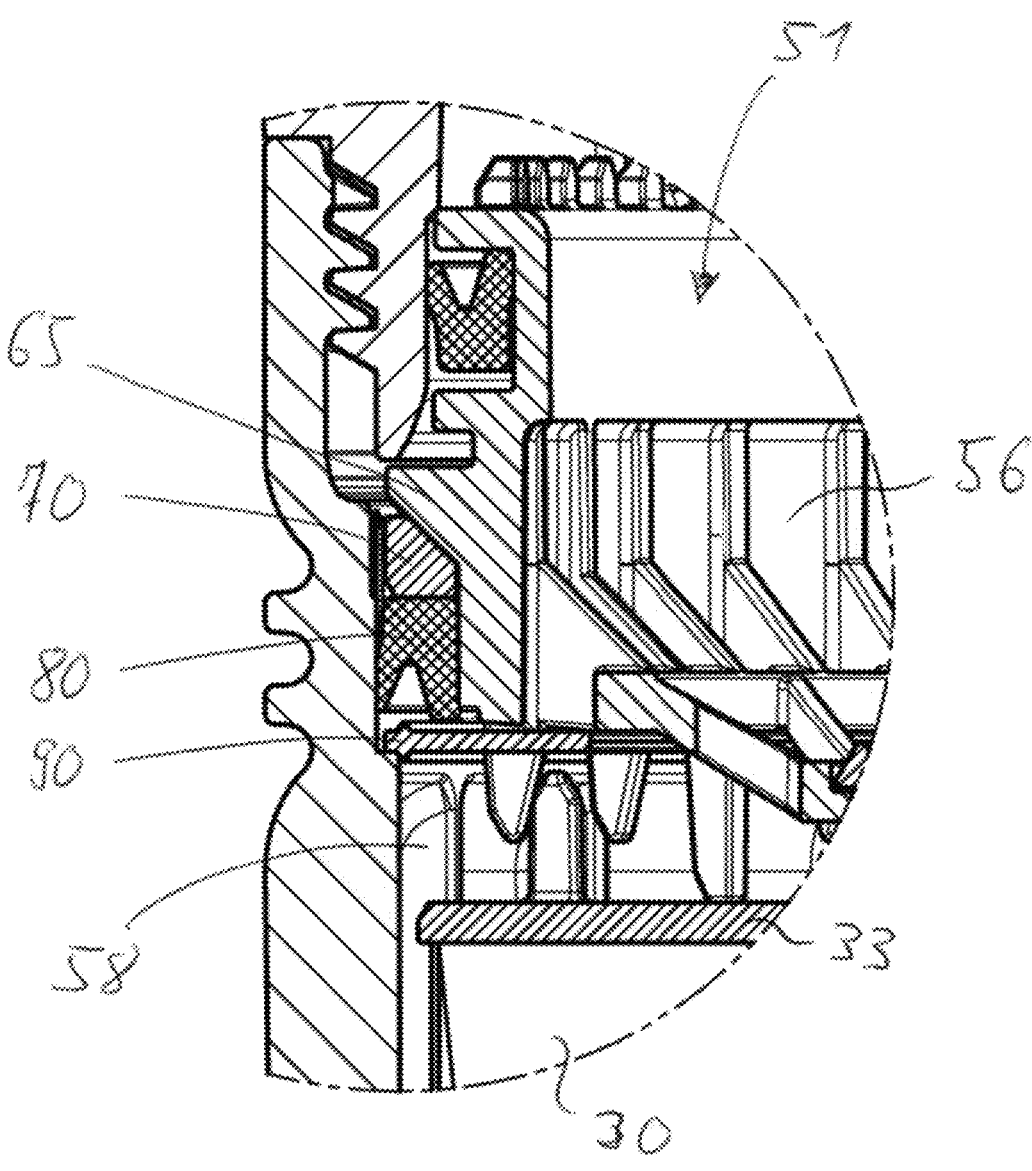
FIG. 13 presents a detail of the filter cartridge of FIG. 11 after being mounted, but prior to its first use.

FIG. 12 and FIG. 13 are almost identical to the FIGS. 1 and 3, respectively. Like in FIG. 1 and FIG. 3, the connector 50 may have a first fluid port 51 being connected via a first conduit 56 to a first fluid opening. A second fluid port of the connector 50 is not present, instead, the fluid channel 37 may be connected with a fluid inlet of the socket 10 via a fluid opening 58 in the front-end cap 33. Beyond the description of FIGS. 1 and 3 can be read as well in FIGS. 12 and 13.

It will be appreciated to those skilled in the art having the benefit of this disclosure that this invention is believed to provide a filter cartridge and filter system. Further modifications and alternative embodiments of various aspects of the invention will be apparent to those skilled in the art in view of this description. Accordingly, this description is to be construed as illustrative only and is provided for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS

1 filter cartridge
2 longitudinal axis
3 forward direction
4 rearward direction
5 first direction
6 second direction
10 socket
15 housing cover facing rim
20 housing cover
25 sealing surface
30 filter element
33 front-end cap
34 rear-end cap 37 fluid channel
50 connector element/connector
51 first fluid port
52 second fluid port
53 forward-facing side
54 rearward-facing side
55 spacer element
56 first conduit
57 second conduit
58 first fluid opening
59 second fluid opening
60 peripheral surface of connector element
61 first ring surface
62 second ring surface
63 intermediate ring surface
65 block/protrusion
70 wedge element
80 gasket
81 first leg
82 second leg
83 central portion
85 gap/groove
86 first gasket portion
87 second gasket portion
90 pusher

The invention claimed is:

1. A filter cartridge configured to be removably inserted into a space of a filter housing that has a housing socket and a housing cover with a sealing surface facing inwards, the filter cartridge comprising:

a filter element forming a fluid channel with a longitudinal axis, a front end, and a rear end;

a connector element attached to the front end, wherein the connector element has at least a forward-facing side facing away from the front end in a forward direction that is parallel to or deviates from the longitudinal axis by an angle that is no larger than 30 degrees, and a rearward-facing side facing towards the filter element in a rearward direction, a peripheral surface with at least a first ring surface and a second ring surface, wherein the first ring surface is located closer to the forward-facing side than the second ring surface; and a first fluid port in fluid communication with a first fluid opening, wherein the first fluid opening is in a radially outward facing surface of the filter cartridge;

a second fluid port in fluid communication with the fluid channel;

wherein the first ring surface and the second ring surface are plain bearing surfaces, wherein a gasket is movably supported in a first axial position on the first ring surface, thereby enabling a translation of the gasket in a first direction to a second axial position onto the second ring surface, and wherein:

(i) a radius of the first ring surface is smaller than a radius of the second ring surface, and/or (ii) the gasket has a first portion with a first connector facing surface defining a first inner radius and a second portion with a second connector facing surface defining a second inner radius, wherein, if the gasket is in the first axial position, the first connector facing surface is located on the first ring surface and is closer to the second ring surface than to the second connector facing surface, and the first inner radius is smaller than the second inner radius, wherein the second inner radius of the second portion increases if the gasket is axially shifted from the first axial position into the second axial position;

wherein:

at least one pusher is located at a side of the gasket facing a direction that is opposite to the first direction;

the at least one pusher radially extends over the front end and/or over the connector element; and a first orthogonal projection of the at least one pusher onto a plane that is orthogonal to the longitudinal axis and a second orthogonal projection of the gasket onto said plane overlap with one another.

2. The filter cartridge of claim 1, wherein the at least one pusher has a gasket-facing pusher surface that provides an abutment delimiting a movement of the gasket in the direction that is opposite to the first direction.

3. The filter cartridge of claim 1, wherein:

the gasket, when in the first axial position on the first ring surface, does not radially protrude over the at least one pusher, and/or the gasket, when located on the second ring surface, protrudes radially over the at least pusher, unless the gasket is radially compressed towards the axis.

4. The filter cartridge of claim 1, wherein an intermediate ring surface with a non-constant diameter is located in between the first ring surface and the second ring surface, and wherein the at least one pusher is axially movable between a first pusher position, in which the at least one pusher abuts the first ring surface, and a second pusher position, in which the at least one pusher sits on a step between the first ring surface and the second ring surface.

5. The filter cartridge of claim 1, wherein the at least one pusher has a radially inwardly facing surface with a radius smaller than a radius of the second ring surface.

6. The filter cartridge of claim 1, wherein spacer elements are positioned in the first fluid opening, wherein at least two spacer elements of said spacer elements have an axial extension equal to an axial dimension of a slot of the filter cartridge and/or wherein a radial extension of the at least two spacer elements matches a radius of the first ring surface.

7. The filter cartridge of claim 1, wherein, as seen in a cross-sectional view, the gasket has a first leg, a second leg, and a central portion, wherein each of the first leg and the second leg has a free end that extends from the central portion in the direction that is opposite to the first direction.

* * * * *